United States Patent
Kuhlmann et al.

(10) Patent No.: US 10,182,249 B2
(45) Date of Patent: Jan. 15, 2019

(54) METHOD FOR RECEIVING BROADCAST RADIO SIGNALS IN A VEHICLE, AND BROADCAST RADIO RECEIVER

(71) Applicant: Continental Automotive GmbH, Hannover (DE)

(72) Inventors: Peter Kuhlmann, Ehringshausen (DE); Gerhard Dochow, Wetzlar (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 15/536,020

(22) PCT Filed: Dec. 10, 2015

(86) PCT No.: PCT/EP2015/079263
§ 371 (c)(1),
(2) Date: Jun. 14, 2017

(87) PCT Pub. No.: WO2016/096604
PCT Pub. Date: Jun. 23, 2016

(65) Prior Publication Data
US 2017/0339441 A1    Nov. 23, 2017

(30) Foreign Application Priority Data

Dec. 16, 2014 (DE) .................. 10 2014 226 142

(51) Int. Cl.
*H04B 17/02* (2006.01)
*H04N 21/24* (2011.01)
(Continued)

(52) U.S. Cl.
CPC ......... *H04N 21/2402* (2013.01); *H04B 1/082* (2013.01); *H04B 7/0837* (2013.01);
(Continued)

(58) Field of Classification Search
CPC ........... H04N 21/2402; H04N 21/2385; H04N 21/25841; H04N 21/41422; H04B 1/082; H04B 7/0837
See application file for complete search history.

(56) References Cited

U.S. PATENT DOCUMENTS

| | | | |
|---|---|---|---|
| 8,705,763 B2 * | 4/2014 | Kimura | G11B 27/00 381/123 |
| 8,762,402 B2 * | 6/2014 | Oi | G11B 27/11 707/758 |

(Continued)

FOREIGN PATENT DOCUMENTS

| CN | 101199200 A | 6/2008 |
|---|---|---|
| CN | 101720059 A | 6/2010 |

(Continued)

OTHER PUBLICATIONS

International Search Report and Written Opinion dated Feb. 19, 2016 from corresponding International Patent Application No. PCT/EP2015/079263.

*Primary Examiner* — Nhan Le

(57) ABSTRACT

A method for receiving broadcast radio signals in a vehicle, particularly in a motor vehicle, and a broadcast radio receiver that is set up to perform the method are described. The method involves multiple reception paths of a broadcast radio receiver being available in order to receive and computationally process broadcast radio signals separately from one another. In addition, the method involves multiple reproduction appliances being connectable to one or more respective reception paths in order to reproduce received broadcast radio signals, wherein multiple reception paths can be combined for a reproduction appliance in order to improve the reception quality. Provision is additionally made for the speed of the vehicle to be ascertained and for the number of reception paths that are combined for a (Continued)

reproduction appliance to be prescribed on the basis of the speed of the vehicle.

18 Claims, 1 Drawing Sheet

(51) Int. Cl.
| | | |
|---|---|---|
| *H04B 1/08* | (2006.01) | |
| *H04B 7/08* | (2006.01) | |
| *H04N 21/2387* | (2011.01) | |
| *H04N 21/258* | (2011.01) | |
| *H04N 21/414* | (2011.01) | |

(52) U.S. Cl.
CPC ... *H04N 21/2387* (2013.01); *H04N 21/25841* (2013.01); *H04N 21/41422* (2013.01)

(56) References Cited

U.S. PATENT DOCUMENTS

| | | | |
|---|---|---|---|
| 8,914,077 B2* | 12/2014 | Matsushita | H04M 1/6091 |
| | | | 455/41.1 |
| 9,197,336 B2* | 11/2015 | Sigal | H04H 20/62 |
| 2002/0174360 A1 | 11/2002 | Ikeda | |
| 2003/0114179 A1 | 6/2003 | Smolyar et al. | |
| 2008/0098439 A1 | 4/2008 | Taura et al. | |
| 2010/0131528 A1* | 5/2010 | Mattis | G06F 17/30038 |
| | | | 707/758 |
| 2013/0096771 A1 | 4/2013 | Srenger | |

FOREIGN PATENT DOCUMENTS

| | | |
|---|---|---|
| DE | 10239216 A1 | 3/2004 |
| DE | 102013201924 A1 | 8/2013 |
| EP | 1318624 A1 | 6/2003 |
| EP | 1657830 B1 | 6/2008 |
| EP | 2037578 B1 | 2/2015 |

* cited by examiner

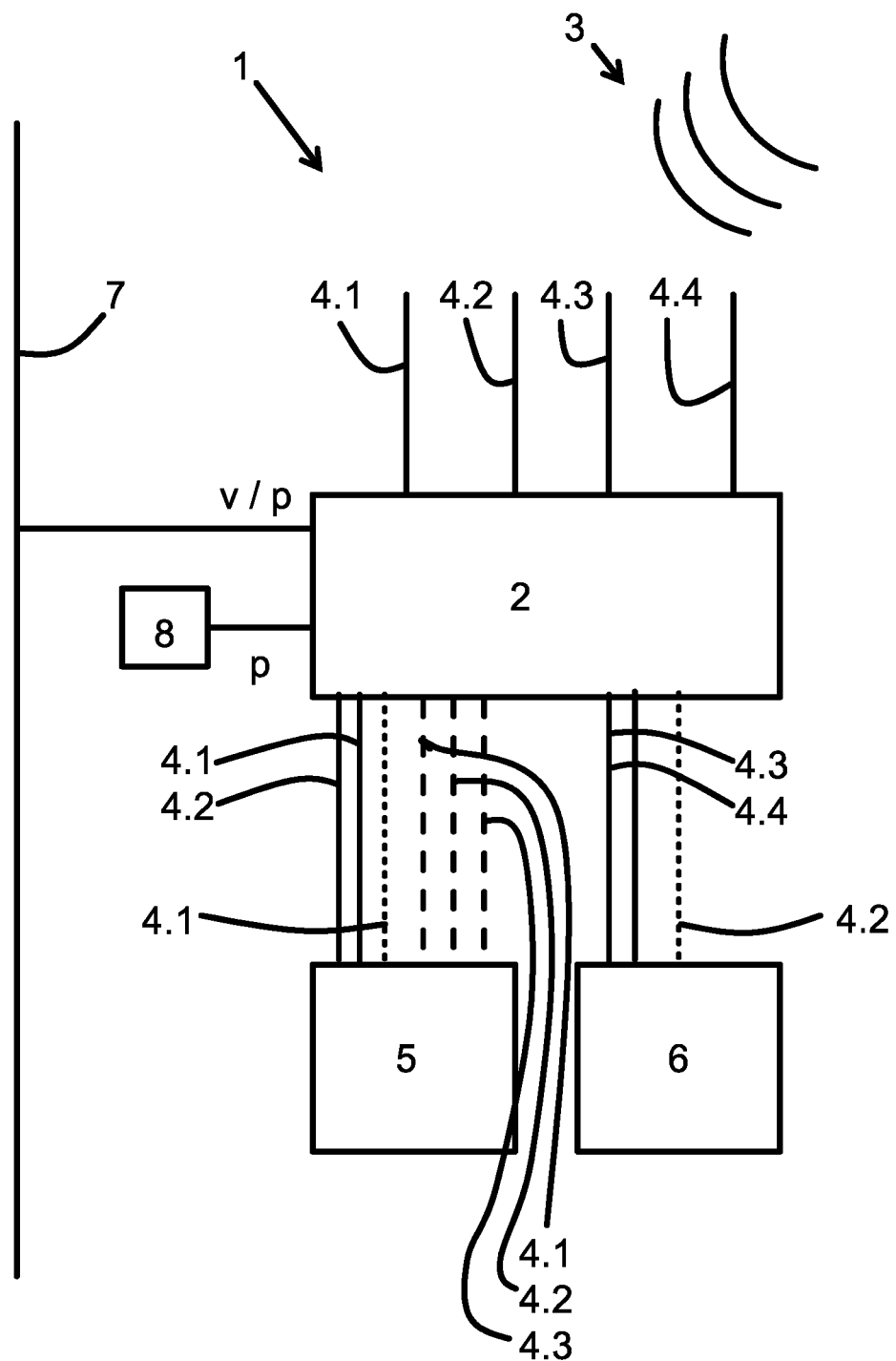

METHOD FOR RECEIVING BROADCAST RADIO SIGNALS IN A VEHICLE, AND BROADCAST RADIO RECEIVER

BACKGROUND

The invention relates to a method for receiving broadcast signals in a vehicle and a broadcast receiving apparatus designed for performing the method, in particular for use in a motor vehicle. It is provided in the method proposed according to the invention that there are available a plurality of reception paths for a broadcast receiver in order to receive and computationally process broadcast signals separately from one another. This operating principle of broadcast receivers is generally known and therefore not described in greater detail.

In addition, a plurality of playback devices can each be connected to one or more reception paths in order to play back received broadcast signals, wherein a plurality of reception paths can be combined for one playback device in order to improve the reception quality.

The reception conditions of broadcast receivers for radio systems such as VHF, shortwave, medium wave, longwave, Digital Radio Mondiale (DRM), Digital Audio Broadcasting (DAB), Digital Video Broadcasting (DVB) or the like are normally impaired by multipath reception. The reason for this lies in frequency-selective and time-selective fading, which is caused by scattering objects, both stationary and moving, and by the broadcast receiver that itself is moving. Examples of scattering objects are mountains, trees, buildings and/or other vehicles. Such broadcast receivers are found in television equipment and/or radio equipment installed in vehicles. These broadcast receivers do not differ fundamentally from broadcast receivers in homes, where they are usually installed as stationary equipment.

It is known in radio systems to provide measures against multipath reception effects and to improve the signal quality. For instance, the Orthogonal Frequency Division Multiplexing technique (OFDM) is known for this purpose, which is performed exclusively in the broadcast receiver. This technique involves signal equalization, radio-channel estimation and signal decoding. These processing steps are also referred to below under the combined term of reception processing.

It is also known that a broadcast receiver uses a plurality of antennas simultaneously, and analyses the signals from these various antennas. This procedure is known as diversity, and has the advantage that by suitable superposition (e.g. phase diversity) of the individual antennas, which have a different signal quality from one another depending on the arrangement and vehicle orientation, it is possible to achieve a better reception quality overall than by using only a single antenna. Alternatively, it is also possible to select the antenna for reception that delivers the best signal quality at that moment (e.g. scan diversity).

It is also known that broadcast receivers use a plurality of reception paths, in which separate computational processing of the received signals takes place. This computational processing is then re-combined in a processor or even in a higher-level processor in order to produce a playback signal of higher quality overall. This procedure is also referred to as separate baseband processing, using the respective reception paths and subsequent combining of the various received signals.

The broadcast receiver normally combines the various received signals in a fixed manner. In some cases, the reception paths are configured on the basis of usage situations.

Examples of this in a motor vehicle are when the user of a rear-seat unit is watching a television program, and the user of a head-unit is not watching a television program. In this case, depending on the resources available, i.e. in particular the number of reception paths available, one reception path can be used for a background search for additional stations, which can then be offered to the user during a change in station. If both the user of the rear-seat unit and the user of the head-unit are watching a television program, all the reception paths are used for this purpose. Then there is no longer a reception path available for a background search for additional stations.

The term "resources" is used in the present disclosure in particular to cover all the hardware elements and software modules involved in a reception path.

In addition, systems have already been specified for switching dynamically in FM broadcast receivers between phase diversity, scan diversity and diversity being disabled according to the reception quality, which has been defined, for example, as multipath, noise, field strength, RDS, bit error rate and/or similar quantities.

The problem with the prior assignment of the reception paths is that either they have a fixed assignment in a playback device or reception quality measurements must be carried out, which can only be assessed reliably with difficulty because of the frequent variation in received signal qualities, especially in a moving motor vehicle. This leads to high processing complexity and sometimes high levels of switching between different diversity settings and reception paths, with the result that only poor use can be made of temporarily unused reception paths for other functions.

The object of the present invention is therefore to achieve a more effective assignment of reception paths to playback devices.

BRIEF SUMMARY

This object is achieved by a method having the features of claim 1 and by a broadcast receiving apparatus having the features of claim 10. In particular in said method and apparatus, the speed of the vehicle is ascertained, and the number of reception paths that are combined for a playback device is defined according to the speed of the vehicle. Thus at system runtime a dynamic decision is made about how the reception paths shall be combined to facilitate for the selected playback devices a signal playback that is as reliable and interference-free as possible in the current situation. This can make use of the knowledge that as the speed of the vehicle increases, more reception paths are needed to facilitate interference-free playback of the broadcast signal on a playback panel.

According to a particularly preferred embodiment, it is hence possible that the number of reception paths combined for a playback device would rise with increasing speed. This can be achieved simply by defining the number of reception paths for a playback device for ascertained speed thresholds of the vehicle. In addition, this can also depend on the nature of the playback device.

It can also be provided that a position of the vehicle is ascertained as part of the method. This may be an absolute position such as obtained from satellite positioning. The positioning receiver, for example a GPS receiver, which is present anyway in most vehicles, can be used for this purpose. It can also be practical, however, to use relative position information about the vehicle, for instance by means of a wheel pulse sensor, gyroscope sensor or the like.

This position information can also be obtained according to the invention in a dead-reckoning process.

In particular for a position of the vehicle ascertained by satellite positioning, the number of reception paths that are combined for a playback device can be defined according to the absolute position of the vehicle. For instance for this purpose, recourse can be made to a database containing position-dependent reception qualities, allowing the reception or reception quality in this position to be inferred directly from the position information. This lends itself particularly to an urban environment in which the changing direction of the buildings relative to the vehicle and the transmitter cause constantly varying reception qualities.

According to a preferred aspect of the present invention, a database containing position-dependent reception qualities can be established from measured reception qualities and/or radio forecasts. In the proposed method, this database can be stored, for example, in the broadcast receiving apparatus or another available memory so that each vehicle can establish highly detailed information about position-dependent reception quality especially at preferred locations visited in the daily routine. This can hence be used to associate the position of the vehicle with the reception quality at the position of the vehicle, and this association can be used directly to define, or be included in determining, the number of reception paths for a playback device. Reception quality thresholds can again be used for this purpose.

It is possible as part of the invention that information present in the vehicle, which can be retrieved, for instance, from control units, is used to ascertain the speed of the vehicle. This is not always possible, however. In such a situation, it is also possible to estimate the speed of the vehicle from position information on the vehicle and from a timestamp belonging to the position information.

Relative position information or position data, for example by means of a wheel sensor or a gyroscope, is also sufficient for this purpose. Connections for such sensors or for the transmission of relevant sensor data can be provided on the broadcast receiving apparatus proposed according to the invention. The position information and the associated timestamps can accordingly be evaluated to ascertain the speed of the vehicle. The position information can come not only from said sensors but obviously also from a GPS receiver. Since ascertaining the speed relies only on a relative time, the timestamps can also originate from a relative clock such as, for instance, a counter or tick count of a processing unit involved. Of course the timestamps can also be calibrated to an absolute time that is obtained using a satellite positioning system (for instance GPS) or the broadcast data of the broadcast system (for instance the time from the RDS group 4a). If the broadcast receiver is combined with a mobile communications receiver, an alternative possibility is to use the data from the currently used mobile communications cell for determining the position.

Based on the position information and the speeds estimated therefrom and on the driving conditions derived from this data, a decision is made about the use of the reception paths and of the resources involved in the reception paths in order to facilitate interference-free playback in the playback device.

It can also be provided here particularly preferably that the number of reception paths that are selected for a playback device is selected on the basis of the number of playback devices that are designated by the user simultaneously for the reception and output of broadcast signals in the vehicle.

In addition to the number of playback devices and/or the aforementioned criteria, it can also be provided that the nature of the playback devices is also included in the decision about how many reception paths are combined for the playback device. It is usually the case that, for instance, video signals or combined video/audio signals place higher demands on the signal quality than pure audio signals. The number of reception channels for TV reception accordingly turns out to be higher than for radio reception in order to be able to play back a broadcast signal that contains as little interference as possible.

It can also be provided as part of the proposed method that the playback devices are ranked, and that lower-ranked playback devices are disabled if a required number of reception channels for interference-free broadcast reception are no longer available. It is thereby possible for the user to define a priority setting for the playback devices, which priority setting may also be reconfigurable, with the result that the reception channels that the user definitely requires are actually available with a high degree of certainty and a reliable broadcast signal.

It can also be provided that playback devices are disabled according to the driving conditions of the vehicle, i.e. in particular according to the speed, although if applicable also according to the position of the vehicle or a combination of speed and position of the vehicle. This makes particular sense when experience dictates that, owing to the driving conditions, it is no longer possible to receive a broadcast signal that is stable over time, and the playback of the broadcast signals is so prone to interference that it is better to disable output of the broadcast signal at least temporarily.

Regardless of which of the aforementioned criteria are selected individually or in combination for enabling and disabling the reception channels and/or for the number of reception channels per playback device, it is proposed according to the invention in a preferred embodiment to use reception channels that are not used for the playback on playback devices to perform a background scan to detect receivable broadcast stations and/or for user services for providing additional data. The background scan is a process that is used to identify stations that can currently be received. These can be pre-stored in the broadcast apparatus so that the user can be offered a choice of currently receivable stations when a change in station is required. The user services may be, for example, program information such as EPG (Electronic Program Guide).

It is also advantageous according to the invention to select the number of reception channels selected for a playback device additionally on the basis of the measured reception quality. This can constitute an additional practical criterion for the selection and can improve further the reception reliability.

The invention relates correspondingly also to a broadcast apparatus as claimed in claim 10 for connecting to preferably a plurality of playback devices, although according to the invention also to just one playback device if applicable, for the playback of broadcast signals. The broadcast apparatus comprises a broadcast receiver having available a plurality of reception paths in order to receive and computationally process broadcast signals separately from one another. In this case, each playback device can be connected to one or more reception paths in order to play back received broadcast signals, wherein a plurality of reception paths can be combined for one playback device in order to improve the reception quality. The technical implementation of such a system is known to a person skilled in the art.

According to the invention, the broadcast receiving apparatus has at least one connection for connecting control units and/or sensors, in order to receive position and/or speed information on the vehicle. The connections can be connections to a GPS receiver in particular or more generally to a satellite positioning device and/or to various sensors, for instance sensors such as a wheel sensor or a gyroscope.

There can also be a connection to a vehicle bus system, with this information being retrievable from various control units.

According to the invention, the broadcast receiving apparatus also comprises a processing unit that is designed to implement some or all of the method described above.

Further advantages, features and possible uses of the present invention also appear in the following description of an exemplary embodiment and in the drawing. All the features described and/or depicted therein constitute individually or in combination the subject matter of the present invention irrespective of how they are combined in the claims or the dependency references thereof.

BRIEF DESCRIPTION OF THE DRAWINGS

FIG. 1 shows schematically a broadcast receiving apparatus in accordance with an embodiment of the invention.

DETAILED DESCRIPTION

The single FIG. 1 shows schematically a broadcast receiving apparatus 1 in a preferred embodiment of the present invention and comprises a broadcast receiver 2 for receiving broadcast signals 3, which are broadcast by broadcast transmitters (not shown). In the example shown, the broadcast receivers 2 have available four reception paths 4.1, 4.2, 4.3 and 4.4. The reception paths 4.1 to 4.4 allow the broadcast receiver 2 to receive and computationally process the broadcast signals 3 separately from one another.

In addition, the reception paths 4.1, 4.2, 4.3 and 4.4 can each be connected to one of two playback devices 5, 6 in the example shown, which are denoted below as first playback device 5 and second playback device 6.

The number of reception paths 4.1 to 4.4 and of playback devices 5, 6 has been chosen only by way of example and shall have no limiting effect on the present invention.

Thus in general the broadcast receiver 2 has available n reception paths and must use said paths to serve m playback devices, which are also referred to as sinks (for the reception paths 4.1 to 4.4). Usually there are more reception paths 4.1 to 4.4 than sinks (playback devices 5, 6) (n>m) in the broadcast receiving apparatus 1, or more precisely in the broadcast receiver 2, in order to be able to combine a plurality of reception paths 4.1, 4.2, 4.3, 4.4 for one playback device 5, 6 if a different broadcast program from different reception paths (i.e. normally on different reception frequencies) is meant to be played back on the playback devices. There is also the possibility of connecting a plurality of playback devices that then can only play back programs from a shared reception channel, however.

In addition, the broadcast receiver 2 has interfaces for the input of position information p and/or speed information v. This information is provided to the receiver either from other control units via a vehicle bus system 7 and/or by suitable sensors 8. Sensors 8 may be a wheel sensor or a gyroscope, for example. Control units for transmitting speed information v and/or position information p via the vehicle bus 7 can be part of satellite positioning systems, for example, which are present as control units in the vehicle.

For instance, it is possible to use a GPS receiver as such a satellite positioning system, or to use a connection to a mobile communications receiver for evaluating the position of the current mobile communications cell.

If it is ascertained from the position information p that the broadcast receiver 2 is located in an area having excellent reception conditions, and/or it is ascertained from the speed information v that the receiver 2 is stationary, it is sufficient to use just one reception path 4 for each sink, i.e. playback device 5, 6. This is represented in FIG. 1 by the dotted lines, of which the reception path 4.1 is connected to the first playback device 5, and the reception path 4.2 is connected to the second playback device 6. The two reception paths 4.3 and 4.4, which in this case are not needed for a playback of the broadcast signals at both playback devices 5, 6, become available for performing a background scan and/or for providing additional program information.

The faster a vehicle is moving, the more reception paths 4 must be used for computing the payload data, in particular audio and/or video services, although possibly also data services, for a playback device 5, 6, for instance in order to be able to correct Doppler effects.

If more reception paths are required for the interference-free reception of an ensemble (grouping of different programs in one reception channel, e.g. the RTL ensemble comprising RTL1, RTL2 and Super RTL as programs) than for the interference-free reception of different ensembles, then according to a separate aspect of the invention, which can be combined with all the described features, according to the invention the playback facility on the playback devices 5 and 6 can be restricted automatically to the playback of the programs available in one reception channel. Which ensemble can be received as the single ensemble by the receiver 2 using all the reception paths required can be decided, for example, by a defined priority setting for the playback devices or by a user prompt at one of the playback devices.

If the relevant reception paths 4.1 to 4.4 and the resources associated therewith are not available for interference-free playback, the playback on one or both playback devices 5, 6 is stopped or muted.

For the situation in which the vehicle is moving faster than a minimum speed vmin, it is intended that a video playback on a display (playback device) facing the driver is disabled. The resources, or reception paths 4.1 to 4.4, associated therewith can then be used for other functions, for instance a background scan or providing additional data such as program information.

In a specific example, the broadcast receiver 2 shown in FIG. 1 is a broadcast receiving apparatus 1 for digital television, which receives e.g. DVB T broadcast signals in a vehicle. The broadcast receiver 2 has four reception paths 4.1 to 4.4 and is intended to serve two playback devices 5, 6, which constitute a head-unit and a rear-seat unit. The head-unit provides a TV signal in the front passenger area, which can also be viewed by the driver. The rear-seat unit provides a TV signal on the rear of the front seats.

Under unfavorable reception conditions and/or at high speed v of the vehicle, the broadcast receiver 2 uses three reception paths 4.1, 4.2, 4.3 to provide a maximum combination of three reception paths 4.1, 4.2, 4.3 and to produce on the first playback device 5 a playback signal that contains as little interference as possible. The playback device 5 is thus provided with a high reliability service. This is indicated in FIG. 1 by the dashed lines of the reception paths 4.1, 4.2 and 4.3.

The broadcast receiver 2 uses the fourth reception path 4.4 in this case for a background scan in order to detect stations that can be received at the current location of the vehicle. The high speed means that the second playback device 6 cannot be used to receive another ensemble.

Under normal reception conditions and at an average speed v of the vehicle, the broadcast receiver 2 uses two reception paths 4 for each sink. Specifically, it connects the reception paths 4.1 and 4.2 to the first payback device 5, and the reception paths 4.3 and 4.4 to the second playback device 6. If the broadcast signal is meant to be presented on both playback devices 5, 6, there is no additional reception path 4.1 to 4.4 available, for instance, for a background scan seeking additional receivable stations or for additional program information.

If the reception conditions for one path are excellent and the vehicle is travelling very slowly, the diversity on a plurality of reception paths 4.1 to 4.4 for a playback device 5, 6 is relinquished. The released reception paths 4.1 to 4.4 can then be used for data services or background scans in the sense of constructing a station list.

The invention can be used to ascertain good reception conditions by means of a good speed of the vehicle, if applicable in conjunction with a good reception power and/or other criteria mentioned by way of example, in order then to make a substantiated decision that it is sufficient to use just two reception paths 4.1, 4.2 for two playback devices 5 and 6. A third reception path 4.3 becomes available to receive via the broadcast system DVB T or even DAB HTML additional pages and to display said pages in the browser on the head-unit. Another reception path 4.4 becomes available for performing a background scan.

Alternatively, under moderate reception conditions, two reception paths 4.1 and 4.2 plus 4.3 and 4.4 can be connected together as a pair to allow the receiver 2 to receive different reception channels (and hence ensembles) and to facilitate the separate playback of different programs from different ensembles on the playback devices 5 and 6.

If the vehicle is moving, the reception paths 4.1 to 4.4 are reconfigured accordingly. First to be relinquished is the reception of data services containing static information (e.g. the downloading of HTML pages). This results in the fewest drawbacks for the user because the receivable HTML pages can still be received in a browser, for instance on a smartphone, that is independent of the vehicle reception.

The invention claimed is:

1. A method for receiving broadcast signals a vehicle, wherein there are available a plurality of reception paths for a broadcast receiver order to receive and computationally process broadcast signals separately from one another, and wherein a plurality of playback devices can each be selectively connected to one or more reception paths in order to play back received broadcast signals, wherein a plurality of reception paths can be combined for one playback device in order to improve the reception quality, characterized in that a current position of the vehicle on the surface of the earth is ascertained, and in that the number of reception paths that are combined for a playback device is defined according to the current position of the vehicle.

2. The method as claimed in claim 1, characterized in that a database containing position-dependent reception qualities is established from measured reception qualities and/or radio forecasts.

3. The method as claimed in claim 1, characterized in that the speed of the vehicle is estimated from position information on the vehicle and from a timestamp belonging to the position information.

4. The method as claimed in claim 3, characterized in that the number of reception paths combined for a playback device rises with increasing speed.

5. The method as claimed in claim 1, characterized in that the number of reception paths that are selected for a playback device is selected on the basis of the number of playback devices that are simultaneously in operation for the reception and output of broadcast signals.

6. The method as claimed in claim 1, characterized in that the playback devices are ranked, and in that lower-ranked playback devices are disabled if a required number of reception channels for interference-free broadcast reception in a higher-ranked playback device are no longer available.

7. The method as claimed in claim 1, characterized in that certain playback devices are disabled according to the driving conditions of the vehicle.

8. The method as claimed in claim 1, characterized in that reception paths that are not used for the playback on playback devices are used to perform a background scan and/or for user services.

9. The method as claimed in claim 1, characterized in that the number of reception paths selected for a playback device are selected on the basis of a measured reception quality.

10. A broadcast receiving apparatus for connecting playback devices for the playback of broadcast signals to a broadcast receiver, which has available a plurality of reception paths in order to receive and computationally process broadcast signals separately from one another, wherein each playback device can be connected to one or more reception paths in order to play back received broadcast signals, and wherein a plurality of reception paths can be combined for one playback device in order to improve the reception quality, characterized in that the broadcast receiving apparatus has connections for connecting control units and/or sensors and has a processing unit, wherein the processing unit is designed to receive the broadcast signals in a vehicle, and wherein a current position of the vehicle on the surface of the earth is ascertained, and the number of reception paths that are combined for a playback device is defined according to the current position of the vehicle.

11. The broadcast receiving apparatus as claimed in claim 10, characterized in that a database containing position-dependent reception qualities is established from measured reception qualities and/or radio forecasts.

12. The broadcast receiving apparatus as claimed in claim 10, characterized in that the speed of the vehicle is estimated from position information on the vehicle and from a timestamp belonging to the position information.

13. The broadcast receiving apparatus as claimed in claim 12, characterized in that the number of reception paths combined for a playback device rises with increasing speed.

14. The broadcast receiving apparatus as claimed in claim 10, characterized in that the number of reception paths that are selected for a playback device is selected on the basis of the number of playback devices that are simultaneously in operation for the reception and output of broadcast signals.

15. The broadcast receiving apparatus as claimed in claim 10, characterized in that the playback devices are ranked, and in that lower-ranked playback devices are disabled if a required number of reception channels for interference-free broadcast reception in a higher-ranked playback device are no longer available.

16. The broadcast receiving apparatus as claimed in claim 10, characterized in that certain playback devices are disabled according to the driving conditions of the vehicle.

17. The broadcast receiving apparatus as claimed in claim 10, characterized in that reception paths that are not used for the playback on playback devices are used to perform a background scan and/or for user services.

18. The broadcast receiving apparatus as claimed in claim 10, characterized in that the number of reception paths selected for a playback device are selected on the basis of a measured reception quality.

* * * * *